United States Patent
Okai et al.

(10) Patent No.: US 9,972,440 B2
(45) Date of Patent: *May 15, 2018

(54) MULTILAYER ELECTRONIC COMPONENT

(71) Applicant: TDK CORPORATION, Tokyo (JP)

(72) Inventors: Keisuke Okai, Tokyo (JP); Makoto Endo, Tokyo (JP); Yohei Noda, Tokyo (JP); Hirobumi Tanaka, Tokyo (JP); Tomomichi Gunji, Tokyo (JP); Yui Sugiura, Tokyo (JP); Hiroshi Shindo, Tokyo (JP)

(73) Assignee: TDK CORPORATION, Tokyo (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/264,190

(22) Filed: Sep. 13, 2016

(65) Prior Publication Data

US 2017/0076864 A1 Mar. 16, 2017

(30) Foreign Application Priority Data

Sep. 15, 2015 (JP) ................................ 2015-182033

(51) Int. Cl.
| | |
|---|---|
| H01G 4/30 | (2006.01) |
| H01G 4/224 | (2006.01) |
| H01G 4/232 | (2006.01) |
| H01G 4/35 | (2006.01) |
| H01G 4/12 | (2006.01) |

(52) U.S. Cl.
CPC .............. *H01G 4/30* (2013.01); *H01G 4/224* (2013.01); *H01G 4/232* (2013.01); *H01G 4/12* (2013.01); *H01G 4/35* (2013.01)

(58) Field of Classification Search
CPC .......... H01G 4/30; H01G 4/224; H01G 4/232; H01G 4/12; H01G 4/35
See application file for complete search history.

(56) References Cited

U.S. PATENT DOCUMENTS

| | | | | |
|---|---|---|---|---|
| 6,124,769 A | * | 9/2000 | Igarashi ................ | H01C 1/142 333/172 |
| 6,965,167 B2 | * | 11/2005 | Liu ........................ | H01G 4/224 257/528 |
| 2006/0139848 A1 | * | 6/2006 | Kim ...................... | H01G 4/012 361/306.3 |
| 2012/0229949 A1 | | 9/2012 | Kim | |

(Continued)

FOREIGN PATENT DOCUMENTS

| | | |
|---|---|---|
| JP | 2004-153121 A | 5/2004 |
| JP | 2012-191159 A | 10/2012 |

OTHER PUBLICATIONS https://www.azom.com/article.aspx?ArticleID=2280, dated Jan. 7, 2004.*

*Primary Examiner* — Dion R Ferguson
(74) *Attorney, Agent, or Firm* — Oliff PLC

(57) ABSTRACT

A multilayer electronic component includes an element body having an internal electrode layer and a dielectric layer. These are substantially parallel to a plane including a first axis and a second axis and are alternately laminated along a third axis direction. Side surfaces facing each other in the first axis direction are respectively equipped with an insulating layer. End surfaces facing each other in the second axis direction are respectively equipped with an external electrode. An elastic modulus of the insulating layer is 12 GPa to 140 GPa.

4 Claims, 8 Drawing Sheets

(56) References Cited

U.S. PATENT DOCUMENTS

2014/0362492 A1* 12/2014 Lee .................. H01G 4/30
                                                    361/301.4
2017/0076870 A1* 3/2017 Noda ................ H01G 4/30

* cited by examiner n − TH LAYER n+1 − TH LAYER

MULTILAYER ELECTRONIC COMPONENT

BACKGROUND OF THE INVENTION

1. Field of the Invention

The present invention relates to a multilayer electronic component.

2. Description of the Related Art

In recent years, a demand for miniaturization of electronic parts associated with the high densification of electronic circuits used in digital electronic devices such as mobile phones has increased, and the miniaturization and capacity enlargement of multilayer electronic components constituting the circuits have been rapidly advanced.

In a multilayer electronic component such as a multilayer ceramic capacitor, a plurality of internal electrodes is arranged in an element body. In Patent Document 1, a plurality of rectangular ceramic green sheets where a conductive paste is printed over the entire width of the ceramic green sheets is laminated and cut to obtain a laminated body where end edges on the both sides of a conductive layer is exposed is obtained.

Then, in Patent Document 1, the laminated body is fired to obtain a ceramic sintered body the end edges of the conductive layer are exposed to not only end surfaces to be connected to external electrodes but to a pair of side surfaces. Next, a ceramic is applied and formed on the side surfaces of the ceramic sintered body. In the multilayer ceramic electronic component having these structure, moisture resistance characteristic etc. is not deteriorated, internal defects are not generated, the possibility that radiation cracks occur can be reduced at the time of forming the external electrodes, and mechanical strength for external shock can be ensured.

However, when a ceramic is baked on side surfaces of a multilayer ceramic electronic component, structural defect of a capacitor is easy to occur due to bad adhesion between the side surfaces and the ceramic (side gap) applied and formed thereon. There is also a problem that a ceramic with high elastic modulus is easy to generate acoustic noise at the time of change of electrostriction particular to the capacitor.

Patent Document 2 discloses the following technique as a countermeasure for the acoustic noise: metal terminals whose cross section is L shaped are attached to both ends of a capacitor body to constitute a ripple capacitor, and the respective metal terminals are soldered on a circuit board in a manner that the capacitor body is floated more than the surface of the circuit board. This makes it possible to prevent vibration noise by avoiding directly transmit vibration of the ripple of the capacitor body to the circuit board.

In Patent Document 2, however, since the ripple capacitor is mounted on the circuit board in a manner that the capacitor body is floated from the surface of the circuit board, the height size of the ripple capacitor cannot help being large, and the technique of Patent Document 2 is inappropriate for mounting structure with restriction in the height direction.

Patent Document 1: JP 2012-191159 A
Patent Document 2: JP 2004-153121 A

SUMMARY OF THE INVENTION

The present invention has been made in view of the above circumstances, and an object thereof is to provide a multilayer electronic component having good thermal shock resistance and reduced acoustic noise.

Means for Solving Problem

In order to achieve the above object, the multilayer electronic component of the present invention is as follows.

[1] A multilayer electronic component comprising an element body having an internal electrode layer and a dielectric layer, both of which are substantially parallel to a plane including a first axis and a second axis and are alternately laminated along a third axis direction, wherein a pair of end surfaces (side surfaces) facing each other in the first axis direction of the element body is respectively equipped with an insulating layer, a pair of end surfaces facing each other in the second axis direction of the element body is respectively equipped with an external electrode electrically connected to the internal electrode layer, and an elastic modulus of the insulating layer is 12 GPa to 140 GPa.

According to the present invention, it is possible to provide a multilayer electronic component having good thermal shock resistance and reduced acoustic noise.

As a specific aspect of [1] above, the following aspects are exemplified.

[2] The multilayer electronic component according to [1], in which the insulating layer integrally has an insulating layer extension portion covering part of end surfaces (main surfaces) facing each other in the third axis direction of the element body and the external electrode covers at least part of the insulating layer extension portion.

[3] The multilayer electronic component according to [2], in which a formula (1) of $1/30 \leq W1/W0 < 1/2$ is satisfied, where W0 denotes a width along the first axis of the element body and W1 denotes a width along the first axis of the insulating layer extension portion.

[4] The multilayer electronic component according to [2] or [3], in which a formula (2) of $0.5 \leq Mf/Mt \leq 2.0$ is satisfied, where Mf denotes a maximum thickness in the third axis direction of the insulating layer from the main surface of the element body and Mt denotes a maximum thickness in the first axis direction of the insulating layer from the side surface of the element body.

[5] The multilayer electronic component according to any of [1] to [4], in which the insulating layer comprises a glass component.

[6] The multilayer electronic component according to any of [1] to [5], in which the insulating layer respectively contains $Bi_2O_3$ and $Na_2O$ of less than 5 mass %.

[7] A method for manufacturing the multilayer electronic component, the method including a step of obtaining a green laminate by laminating a green sheet having an internal electrode pattern layer that is continuous in a first axis direction and is substantially parallel to a plane including a first axis and a second axis formed in a third axis direction, a step of obtaining a green chip by cutting the green laminate so as to obtain a cutting plane parallel to a plane including a second axis and a third axis, a step of obtaining an element body having an internal electrode layer and a dielectric layer alternately laminated by calcining the green chip, a step of obtaining a ceramic sintered body having an insulating layer formed by coating and baking a paste for insulating layer on an end surface in the first axial direction of the element body, and a step of obtaining a multilayer electronic component where an external electrode is formed by baking a paste for external layer on an end surface in the second axial direction of the ceramic sintered body, in which an elastic modulus of the insulating layer is 12 GPa to 140 GPa.

BRIEF DESCRIPTION OF THE DRAWINGS

FIG. 5Ab is a plan view illustrating a portion of the n+1-th internal electrode pattern layer.

DESCRIPTION OF THE PREFERRED EMBODIMENTS

Figure 1:
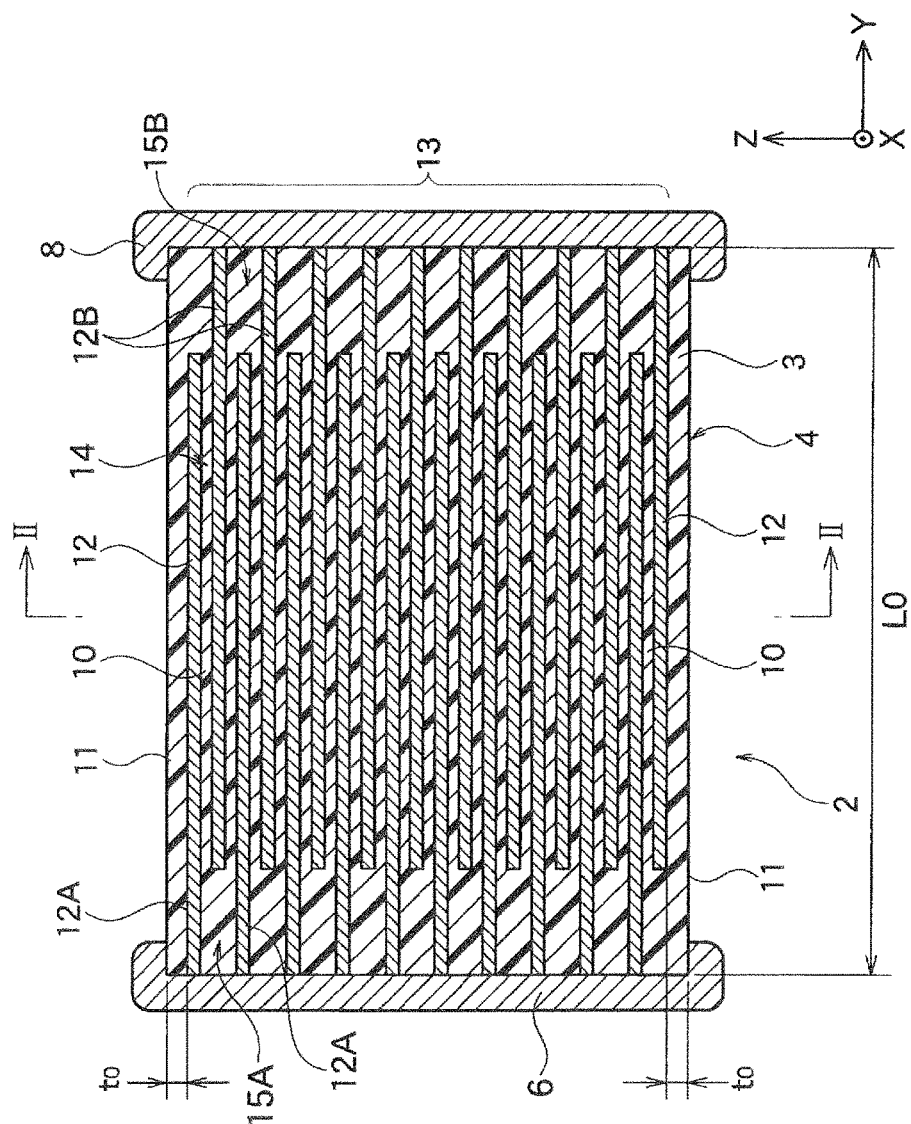
FIG. 1 is a schematic cross-sectional view of the multilayer ceramic capacitor according to an embodiment of the present invention.

The present invention will be described in detail based on the present embodiment with reference to the drawings, but the present invention is not limited to the embodiment to be described below.

In addition, the constituents to be described below include those that can be easily presumed by those skilled in the art and those that are substantially the same with one another. Furthermore, the constituents to be described below can be appropriately combined with one another.

Hereinafter, the present invention will be described based on the embodiment illustrated in the drawings.

Overall Configuration of Multilayer Ceramic Capacitor

As an embodiment of the laminated electronic component according to the present embodiment, the overall configuration of a multilayer ceramic capacitor will be described.

Figure 2:
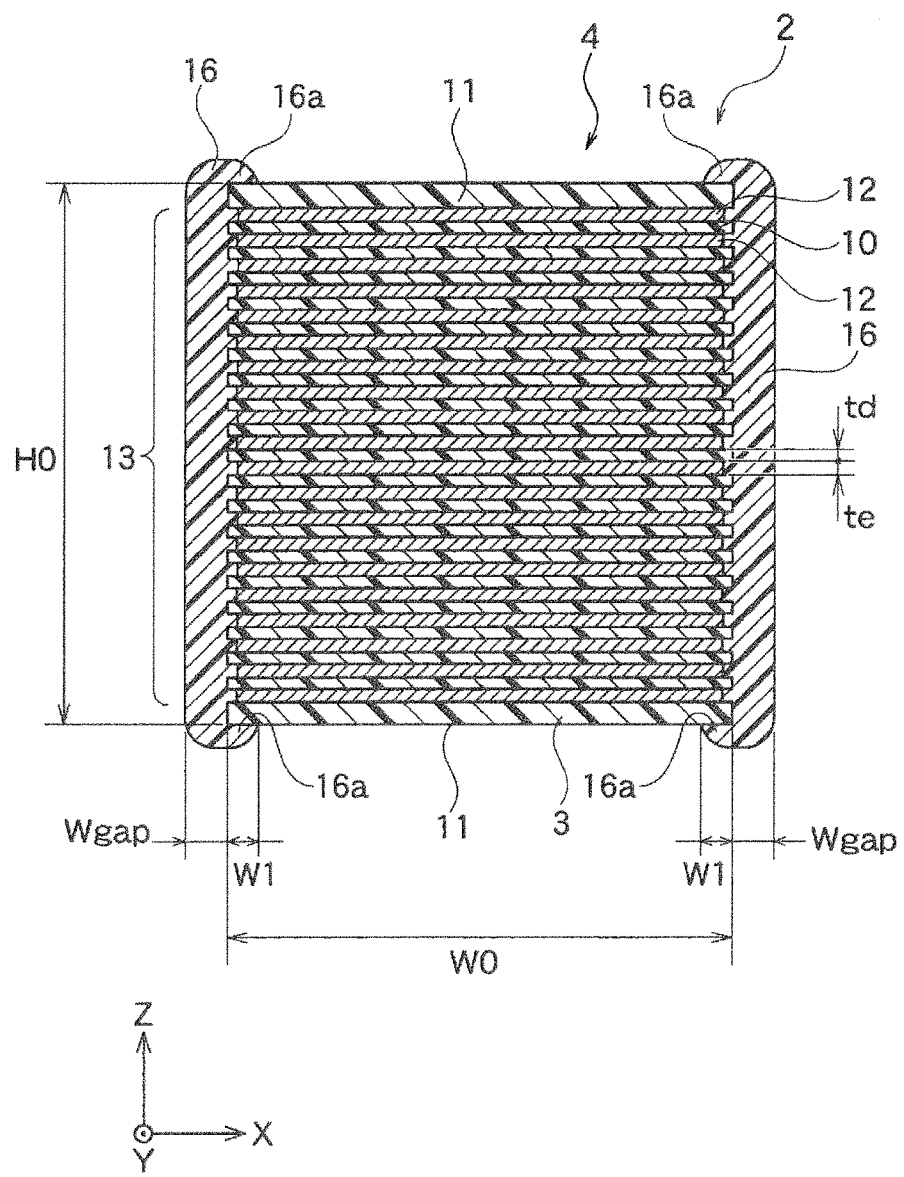
FIG. 2 is a cross-sectional view taken along the line II-II illustrated in FIG. 1.

As illustrated in FIG. 1, a multilayer ceramic capacitor 2 according to the present embodiment includes a ceramic sintered body 4, a first external electrode 6, and a second external electrode 8. In addition, as illustrated in FIG. 2, the ceramic sintered body 4 has an element body 3 and an insulating layer 16.

The element body 3 has an inner dielectric layer 10 and an internal electrode layer 12 which are substantially parallel to a plane including an X-axis and a Y-axis, and the internal electrode layer 12 is alternately laminated between the inner dielectric layers 10 along a Z-axis direction. Here, the term "substantially parallel" means that the most part is parallel but there may be a part that is not parallel, and it intends that the internal electrode layer 12 and the inner dielectric layer 10 may be a little irregular or tilted.

The portion at which the inner dielectric layer 10 and the internal electrode layer 12 are alternately laminated is an interior region 13.

In addition, the element body 3 has an exterior region 11 on both end surfaces in the laminating direction Z (Z-axis) thereof. The exterior region 11 is formed by laminating a plurality of outer dielectric layers that are thicker than the inner dielectric layer 10 constituting the interior region 13.

Incidentally, hereinafter, the "inner dielectric layer 10" and the "outer dielectric layer" are collectively referred to as the "dielectric layer" in some cases.

The material for the inner dielectric layer 10 and the dielectric layer constituting the exterior region 11 may be the same as or different from each other, and it is not particularly limited, and for example, they may be constituted to contain a dielectric material having a perovskite structure such as $ABO_3$ or an alkali niobate-based ceramic as a main component.

In $ABO_3$, for example, A is at least one kind such as Ca, Ba, or Sr, and B is at least one kind such as Ti or Zr. The molar ratio of AB is not particularly limited, and it is from 0.980 to 1.020.

In addition to this, examples of an accessory component may include silicon dioxide, aluminum oxide, magnesium oxide, an alkali metal compound, an alkaline earth metal compound, manganese oxide, a rare earth element oxide, and vanadium oxide, but it is not limited to these. The content thereof may also be appropriately determined in accordance with the composition and the like.

Incidentally, it is possible to lower the calcination temperature by using silicon dioxide and aluminum oxide as the accessory component. In addition, the lifespan can be improved by using magnesium oxide, an alkali metal compound, an alkaline earth metal compound, manganese oxide, a rare earth element oxide, and vanadium oxide as the accessory component.

One internal electrode layer 12 to be alternately laminated has a lead portion 12A that is electrically connected to the inner side of a first external electrode 6 formed on the outer side of a first end portion in a Y-axis direction of the ceramic sintered body 4. In addition, the other internal electrode layer 12 has a lead portion 12B that is electrically connected to the inner side of a second external electrode 8 formed on the outer side of a second end portion in a Y-axis direction of the ceramic sintered body 4.

The interior region 13 has a capacity region 14 and lead regions 15A and 15B. The capacity region 14 is a region in which the internal electrode layer 12 is laminated along the laminating direction so as to sandwich the inner dielectric layer 10. The lead region 15A is a region located between the lead portions 12A of the internal electrode layers 12 to be connected to the external electrodes 6. The lead region 15B is a region located between the lead portions 12B of the internal electrode layers 12 to be connected to the external electrodes 8.

The conductive material contained in the internal electrode layer 12 is not particularly limited, and it is possible to use a metal such as Ni, Cu, Ag, Pd, Al, or Pt and an alloy thereof. As a Ni alloy, an alloy of Ni with one or more kinds of elements selected from Mn, Cr, Co, or Al is preferable, and the Ni content in the alloy is preferably 95 wt % or more. Incidentally, various kinds of trace components such as P may be contained in Ni or a Ni alloy at about 0.1 wt % or less.

The internal electrode layer 12 may be formed by using a commercially available electrode paste, and the thickness of the internal electrode layer 12 may be appropriately determined in accordance with the application and the like.

As illustrated in FIG. 2, both end surfaces in the X-axis direction of the ceramic sintered body 4 are equipped with the insulating layers 16 covering the end surfaces of the internal electrode layer 12 of the element body 3.

In the present embodiment, a reaction phase generated by the diffusion of at least one of the constituents of the insulating layer 16 to the inner dielectric layer 10 may be formed at the interface between the insulating layer 16 and the inner dielectric layer 10. By having a reaction phase at the interface between the insulating layer 16 and the inner dielectric layer 10, the side surfaces of the element body 3 are embedded in glass and the porosity at the interface can be suppressed to the minimum. This improves the insulating properties of the end surface of the element body 3 and makes it possible to improve the voltage endurance. In addition, by having a reaction phase at the interface between the insulating layer 16 and the dielectric layer 10, it is possible to improve the adhesive properties at the interface between the insulating layer 16 and the dielectric layer. This suppresses the delamination of the element body 3 and the insulation layer 16 and makes it possible to enhance the bending strength thereof.

With regard to the acknowledgement of reaction phase, for example, the STEM-EDS analysis of the Si element at the interface between the dielectric layer and insulating layer of the ceramic sintered body is conducted to obtain the mapping data of the Si element, and the place at which the Si element is present is acknowledged as the reaction phase.

In the present embodiment, the end portion in the X-axis direction of the internal electrode layer 12 sandwiched between the inner dielectric layers 10 adjacent in the laminating direction (Z-axis direction) is recessed on the end surface in the X-axis direction of the element body 3, namely, at the predetermined retraction length from the X-axis direction end portion to the inner side of the dielectric layer 10. The retraction length may be different from each internal electrode layer 12, but its average is zero or more, for example, and is preferably 0.1 to 5.0 μm.

Incidentally, retraction of the ends in the X-axis direction of the internal electrode layers 3 can be removed by polishing, such as barrel polishing, the end surfaces in the X-axis direction of the element body 3 before forming the insulating layers 16. The retraction of the X-axis direction end portion of the internal electrode layer 12 is formed, for example, by the difference in sintering shrinkage factor between the material to form the internal electrode layer 12 and the material to form the inner dielectric layer 10.

It is preferable that the insulating layers 16 according to the present embodiment integrally have insulating layer extension portions 16a covering both ends in the X-axis direction of the end surfaces (main surfaces) in the Z-axis direction of the element body 3. Although not illustrated, both end portions in the Z-axis direction of the external electrodes 6 and 8 cover both end portions in the Y-axis direction of the insulating layer extension portions 16a. Furthermore, in the present embodiment, both ends in the X-axis direction of the external electrodes 6 and 8 illustrated in FIG. 1 do not cover both ends in the Y-axis direction of the insulating layer 16 illustrated in FIG. 2 from both sides in the X-axis direction, but may cover them.

An elastic modulus of the insulating layer according to the present embodiment is 12 GPa to 140 GPa. This makes is possible to reduce structural defect and acoustic noise due to electrostriction. Thus, the multilayer ceramic capacitor according to the present embodiment can be even mounted on a mounting area limited in the height direction without using terminal metal fitting etc., and can prevent acoustic noise. The inventors of the present invention consider the reason such effect can be obtained as below.

When baking a ceramic on an internal electrode layer exposed from an element body, the ceramic and end surfaces of the element body are not sufficiently adhered. Also, a ceramic has a high elastic modulus. These are the reasons structural defect and acoustic noise are easy to occur.

In contrast, the insulating layers 16 according to the present embodiment integrally have insulating layer extension portions 16a covering both ends in the X-axis direction of both end surfaces in the Z-axis direction of the element body 3, and also have an elastic modulus that is lower than that of the ceramic. This configuration of the insulating layers 16 can prevent deformation of the element body 3 due to electrostriction. Also, stress due to electrostriction can be reduced by lowering the elastic modulus of the insulating layer 16. It is consequently considered that structural defect and acoustic noise due to electrostriction, which are the conventional technical problems, can be reduced.

The insulating layers 16 may cover part of the end portion in the X-axis direction of both end surfaces in the Y-axis direction of the element body 3.

The softening point of the insulating layer 16 is preferably 500° C. to 1000° C. This can reduce influence of structural defect that can be generated in the preceding or following step.

The insulating layer 16 according to the present embodiment has any component satisfying the above elastic modulus, such as ceramic, aluminum, glass, titanium, and epoxy resin, but is preferably composed of glass component. In addition, the fixing strength is improved by constituting the insulating layer 16 by a glass component. It is considered that this is because a reaction phase is formed at the interface between the glass and the element body 3 and thus the adhesive properties between the glass and the element body 3 is superior to other insulating materials.

By covering the end surface in the X-axis direction of the element body 3 with the insulating layer 16, not only the insulating properties are enhanced but also the durability and moisture resistance to the environmental impact from the outside are enhanced. Since the end surface in the X-axis direction of the fired ceramic sintered body 4 is covered with the insulating layer 16, the width of the side gap is small and a uniform insulating layer 16 can be formed.

The insulating layer 16 according to the present embodiment is composed of any glass component containing alkali metal oxide of BaO, $SiO_2$, and Na, $Bi_2O_3$, $ZrO_2$, $Al_2O_3$, CaO.

The insulating layer 16 according to the present embodiment preferably contains $Bi_2O_3$ and $Na_2O$ of less than 5 mass %, respectively. This can improve plating resistance. Incidentally, the case that $Bi_2O_3$ and $Na_2O$ are respectively contained by less than 5 mass % includes the case that the amount of $Bi_2O_3$ and/or the amount of $Na_2O$ is/are 0 mass %.

The material of the external electrodes 6 and 8 is not limited either, but a well-known conductive material, such as Cu, Ag, Pd, Pt, Au, alloy thereof, and conductive resin, can be used. The thickness of the external electrodes may be appropriately determined in accordance with the application and the like.

Incidentally, in FIG. 1, the X-axis, the Y-axis, and the Z-axis are perpendicular to one another, the Z-axis coincides with the laminating direction of the inner dielectric layer 10 and the internal electrode layer 12, the Y-axis coincides with the direction in which the lead regions 15A and 15B (lead portions 12A and 12B) are formed.

In the present embodiment, as illustrated in FIG. 2, the section from the end surface in the X-axis direction of the element body 3 to the outer surface of the insulating layer 16 along the width direction (X-axis direction) of the ceramic sintered body 4 in the insulating layer 16 is adopted as the gap portion.

In the present embodiment, the width Wgap in the X-axis direction of the gap portion coincides with the dimensions from the end surface in the X-axis direction of the element body 3 to the end surface in the X-axis direction of the insulating layer 16 along the width direction (X-axis direction) of the ceramic sintered body 4, but the width Wgap is not necessarily uniform along the Z-axis direction but may be a bit varied. The width Wgap is preferably 0.1 μm to 40 μm, which is significantly small, compared with the width W0 of the element body 3. In the present embodiment, the width Wgap can be significantly reduced compared with a conventional one, and a retraction length of the internal electrode layer 12 is sufficiently small. Thus, in the present embodiment, a multilayer capacitor having small size and large capacitance can be obtained.

Incidentally, the width W0 of the element body 3 coincides with the width along the X-axis direction of the inner dielectric layer 10.

By setting Wgap to be within the above range, a decrease in electrostatic capacity is small even when the ceramic sintered body 4 is more compact as well as cracking hardly occurs.

Figure 3A:
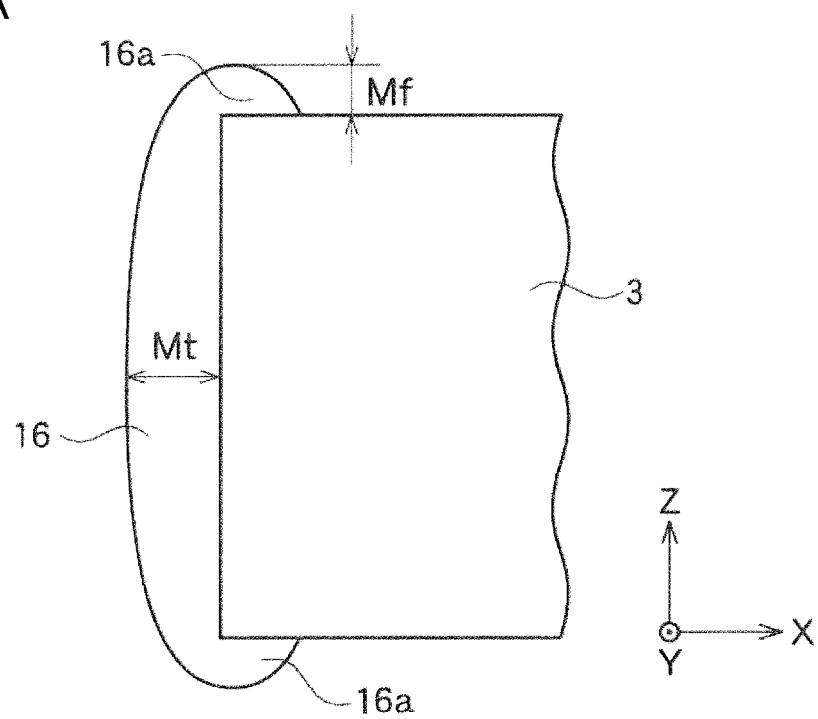
FIG. 3A is a schematic view for explaining the ratio Mf/Mt of the insulating layer in FIG. 2.
Figure 3B:
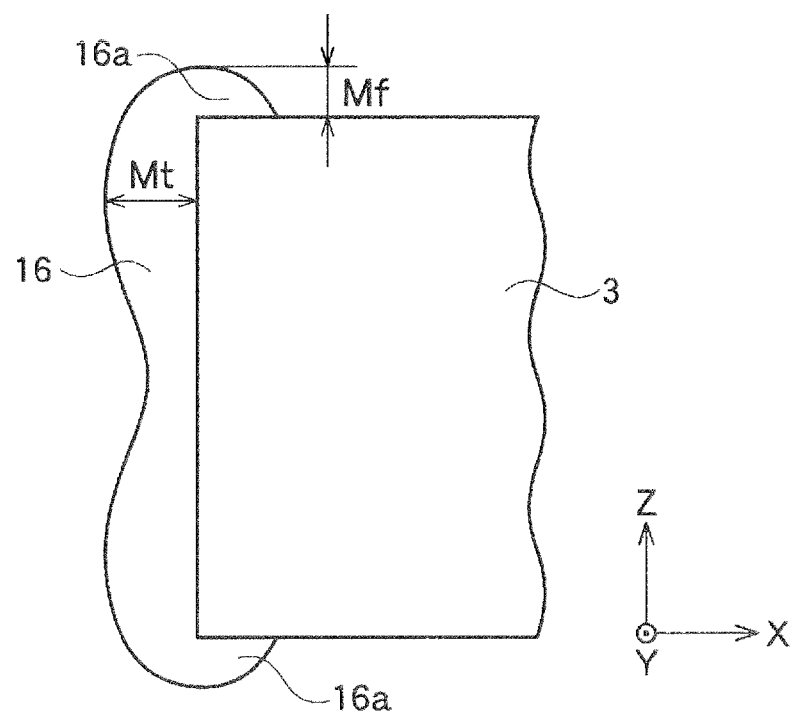
FIG. 3B is a schematic view for explaining the ratio Mf/Mt of the insulating layer in FIG. 2.

In the present embodiment, as illustrated in FIG. 3A and FIG. 3B, the insulating layer extension portions 16a covering the end portion in the X-axis direction on both end surfaces in the Z-axis direction of the element body 3 are integrally formed with the insulating layer 16 at both ends in the Z-axis direction of the insulating layer 16. The ratio between the respective widths W1 and W0 in the X-axis direction of the insulating layer extension portion 16a from both end surfaces in the X-axis direction of the element body 3 is preferably $1/30 \leq W1/W0 < 1/2$.

When W1/W0 is 1/30 or more, structural defect and acoustic noise due to electrostriction can be further reduced. Also, W1/W0 may be 1/2. In this case, one of the insulating layer extension portions 16a and the other insulating layer extension portion 16a are configured to be connected. That is, the four surfaces of the main surfaces and the side surfaces of the element body 3 are covered with the insulating layer 16. In this case, an insulating layer covering the end surfaces in the X-axis direction of the element body 3 may become thin depending on coating method for the insulating layer 16, and the effect of reducing electrostriction tends to be lowered.

As illustrated in FIG. 3A, it is preferable to satisfy $0.5 \leq Mf/Mt \leq 2.0$, where Mf denotes a maximum thickness in the Z-axis direction of the insulating layer 16 from the end surface in the Z-axis direction of the element body 3, and Mt denotes a maximum thickness in the X-axis direction of the insulating layer 16 from the end surface in the X-axis direction of the element body 3.

This makes it possible to obtain a multilayer capacitor having good fixing strength and excellent mountability.

When Mf/Mt is 0.5 or more, the end surfaces in the Z-axis direction are sufficiently coated and acoustic noise can be reduced, compared with when Mf/Mt is less than 0.5.

When Mf/Mt is 2.0 or less, soldering at the time of mounting is favorably performed and fixing strength is good, compared with when Mf/Mt is more than 2.0.

Incidentally, the middle part of the insulating layer 16 formed on the end surface in the X-axis direction of the element body 3 may be recessed, as illustrated in FIG. 3B. In this case, two convex portions appear on the parallel cross section to the Z-X plane of the insulating layer 16. In this case, the thicker one of the two convex portions is considered to be a maximum thickness Mt.

The widths Wgap of both sides in the X-axis direction of the ceramic sintered body 4 may be the same as or different from each other. The widths W1 of both sides in the X-axis direction of the ceramic sintered body 4 may be the same as or different from each other. It is preferable that the insulating layer 16 does not largely cover both end surfaces in the Y-axis direction of the element body 3 illustrated in FIG. 1. This is because the external electrodes 6 and 8 need to be formed on both end surfaces in the Y-axis direction of the element body 3 and need to be connected to the internal electrodes 12. Also, the external electrodes 6 and 8 are configured to cover the insulating layer extension portions 16a.

The thickness "td" of the inner dielectric layer 10 is not particularly limited, but is preferably 0.1 μm to 5.0 μm.

The thickness "te" of the internal electrode layer 12 is not particularly limited, but is preferably 0.1 μm to 5.0 μm.

The thickness "to" of the exterior region 11 is not particularly limited, but is preferably 0.1 μm to 40.0 μm.

Method for Manufacturing Multilayer Ceramic Capacitor

Next, a method for manufacturing the multilayer ceramic capacitor 2 as an embodiment of the present invention will be specifically described.

First, a paste for inner green sheet and a paste for outer green sheet are prepared in order to manufacture an inner green sheet 10a to constitute the inner dielectric layer 10 illustrated in FIG. 1 after calcination and an outer green sheet 11a to constitute the outer dielectric layer illustrated in FIG. 1 after calcination.

The paste for inner green sheet and the paste for outer green sheet are usually composed of an organic solvent-based paste obtained by kneading a ceramic powder with an organic vehicle or an aqueous paste.

The raw material for the ceramic powder can be appropriately selected from various kinds of compounds to be composite oxides or oxides, for example, carbonates, nitrates, hydroxides, and organic metal compounds are used by being mixed. In the present embodiment, the raw material for the ceramic powder is used as a powder having an average particle size of 0.45 μm or less and preferably about from 0.1 to 0.3 μm. Incidentally, it is desirable to use a powder finer than the thickness of the green sheet in order to obtain a significantly thin inner green sheet.

The organic vehicle is one that is obtained by dissolving a binder in an organic solvent. The binder used in the organic vehicle is not particularly limited, and it may be appropriately selected from various kinds of common binders such as ethyl cellulose and polyvinyl butyral. The organic solvent to be used is also not particularly limited, and it may be appropriately selected from various kinds of organic solvents such as an alcohol, acetone, and toluene.

In addition, the paste for green sheet may contain additives selected from various kinds of dispersants, plasticizers, dielectrics, accessory component compounds, glass frits, and insulating materials.

Examples of the plasticizer may include an ester of phthalic acid such as dioctyl phthalate or benzyl butyl phthalate, adipic acid, an ester of phosphoric acid, and a glycol.

Next, a paste for internal electrode layer is prepared in order to manufacture an internal electrode pattern layer 12a to constitute the internal electrode layers 12A and 12B illustrated in FIG. 1 after calcination. The paste for internal electrode layer is prepared by kneading a conductive material composed of various kinds of conductive metals or alloys described above with the organic vehicle described above.

When using Ni as the conductive material, Ni powder prepared by using a commercially available CVD method, wet chemical reduction method, or the like may be used.

The paste for external electrode to constitute the external electrodes 6 and 8 illustrated in FIG. 1 after calcination may be prepared in the same manner as the paste for internal electrode layer described above.

Figure 4:
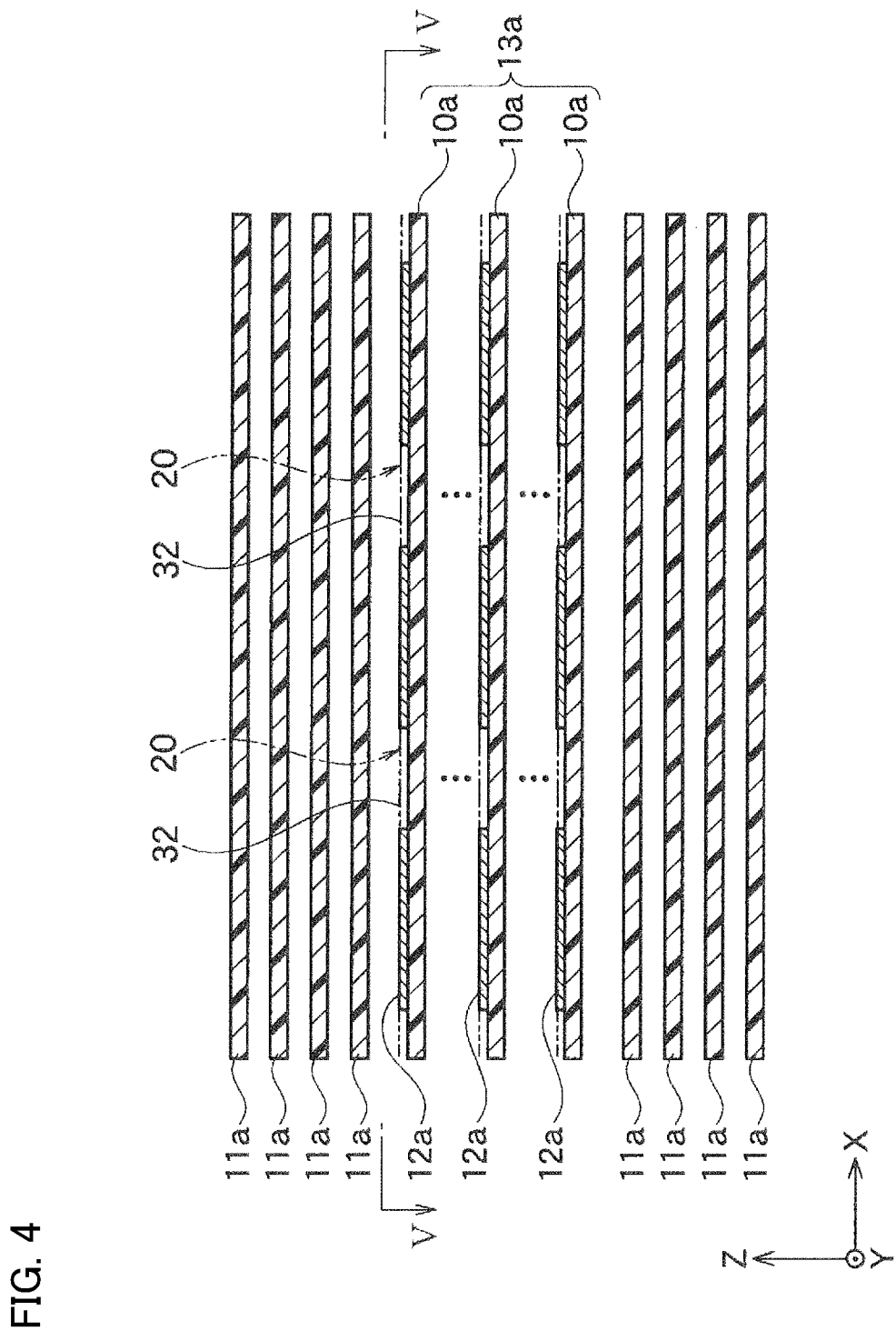
FIG. 4 is a schematic cross-sectional view illustrating the step of laminating a green sheet in the manufacturing process of a multilayer ceramic capacitor illustrated in FIG. 1.

The inner green sheet 10a and the internal electrode pattern layer 12a are alternately laminated as illustrated in FIG. 4 by using the paste for inner green sheet and the paste for internal electrode layer prepared in the above to manufacture an internal laminate 13a. In addition, after the internal laminate 13a is manufactured, the outer green sheet 11a is formed thereon by using the paste for outer green sheet, and the resultant is pressurized in the laminating direction to obtain a green laminate.

Incidentally, as a method for manufacturing the green laminate, in addition to the above, a green laminate may be obtained by alternately laminating a predetermined number of the inner green sheet 10a and the internal electrode pattern layer 12a directly on the outer green sheet 11a and pressurizing the resultant in the laminating direction.

Specifically, first, the inner green sheet 10a is formed on a carrier sheet (for example, a PET film) as a support by a doctor blade method. The inner green sheet 10a is dried after being formed on the carrier sheet.

Next, as illustrated in FIG. 4, the internal electrode pattern layer 12a is formed on the surface of the inner green sheet 10a by using the paste for internal electrode layer to obtain the inner green sheet 10a having the internal electrode pattern layer 12a.

Figure 5A:
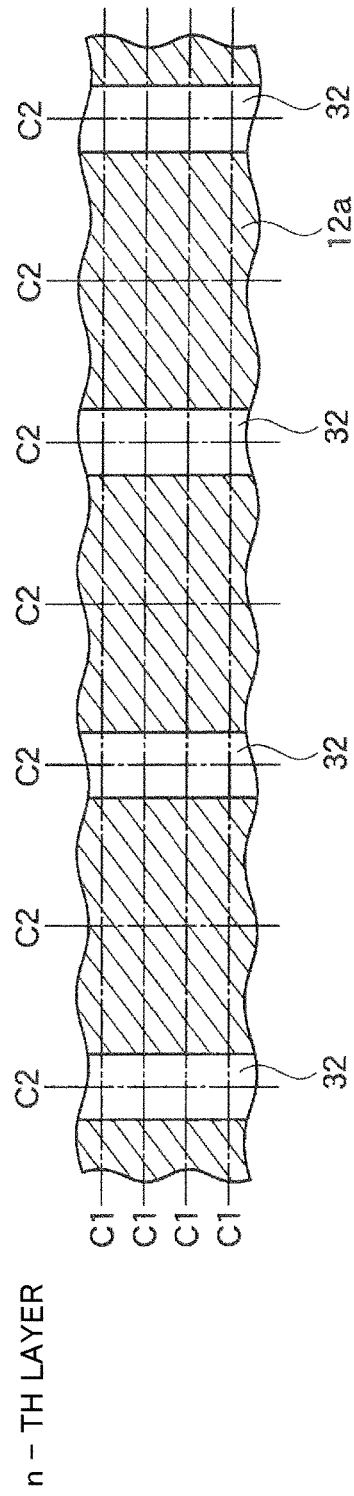
FIG. 5Aa is a plan view illustrating a portion of the n-th internal electrode pattern layer taken along the line V-V illustrated in FIG. 4.
Figure 5A:
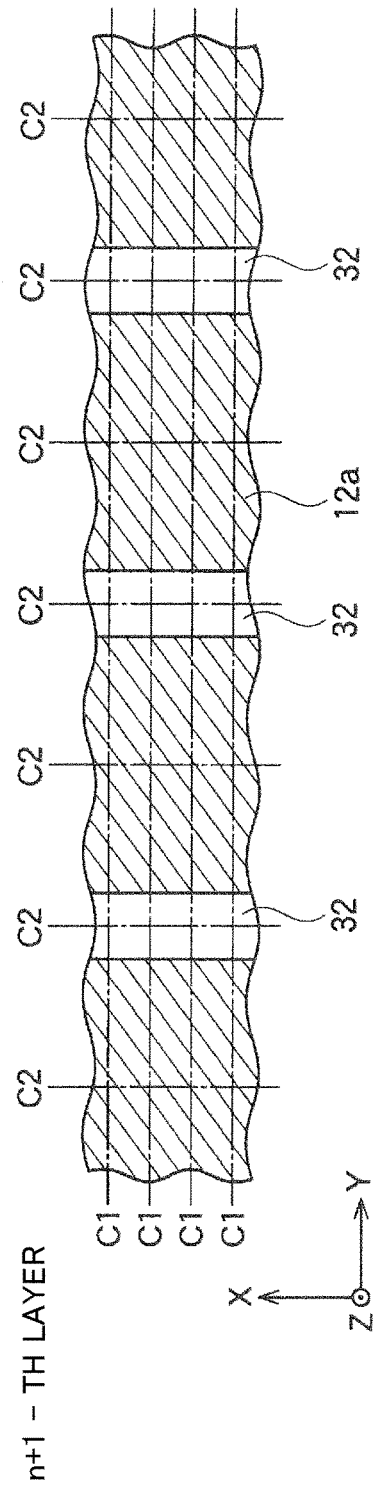

At this time, as illustrated in FIG. 5Aa, a gap 32 of the internal electrode pattern layer 12a is formed in the Y-axis direction and a continuous flat internal electrode pattern layer 12a is formed in the X-axis direction at the n-th layer.

Next, as illustrated in FIG. 5Ab, the gap 32 of the internal electrode pattern layer 12a is formed in the Y-axis direction and a continuous flat internal electrode pattern layer 12a is formed in the X-axis direction at the (n+1)-th layer as well. At this time, the gaps 32 of the internal electrode pattern layer of the n-th layer and the (n+1)-th layer are formed so as not to overlap each other in the Z axis direction of the laminating direction.

In this manner, the internal laminate 13a is manufactured by laminating a plurality of the inner green sheet 10a having the internal electrode pattern layer 12a, an appropriate number of the outer green sheets 11a is then formed above and below the internal laminate 13a by using the paste for outer green sheet, and the resultant is pressurized in the laminating direction to obtain a green laminate.

Figure 6A:
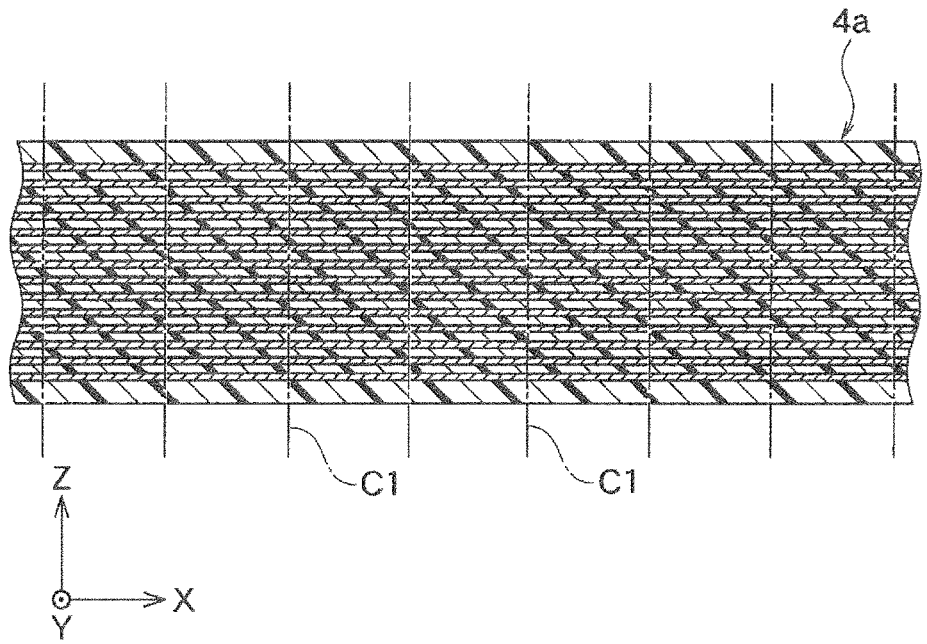
FIG. 6A is a schematic cross-sectional view of the laminate after lamination of the green sheet illustrated in FIG. 4 parallel to the X-Z-axis plane.
Figure 6B:
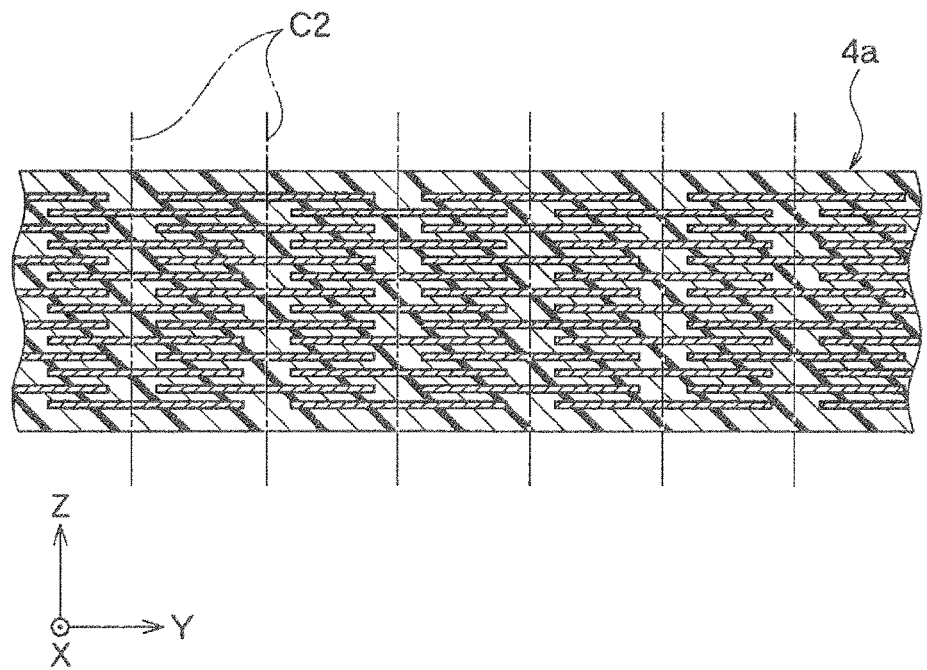
FIG. 6B is a schematic cross-sectional view of the laminate after the lamination of the green sheet illustrated in FIG. 4 parallel to the Y-Z-axis plane.

Next, the green laminate is cut along a cutting plane C1 and a cutting plane C2 in FIG. 5Aa, FIG. 5Ab, FIG. 6A, and FIG. 6B to obtain a green chip. C1 is a cutting plane parallel to the Y-Z axis plane, and C2 is a cutting plane parallel to the Z-X-axis plane.

As illustrated in FIG. 5Aa, the cutting plane C2 on the both sides of the cutting plane C2 to cut the internal electrode pattern layer 12a at the n-th layer cuts the gap 32 of the internal electrode pattern layer 12a. In addition, the cutting plane C2 which has cut the internal electrode pattern layer 12a at the n-th layer cuts the gap 32 of the internal electrode pattern layer 12a at the (n+1)-th layer.

By obtaining the green chip by such a cutting method, the n-th internal electrode pattern layer 12a of the green chip is configured to be exposed on one cutting plane and not to be exposed on the other cutting plane in the cutting plane C2 of the green chip. In addition, the (n+1)-th internal electrode pattern layer 12a of the green chip has a configuration in which the internal electrode pattern layer 12a is not exposed on the other cutting plane on which the internal electrode pattern layer 12a is exposed at the n-th layer and the internal electrode pattern layer 12a is exposed on one cutting plane on which the internal electrode pattern layer 12a is not exposed at the n-th layer on the cutting plane C2 of the green chip.

Furthermore, the internal electrode pattern layer 12a is configured to be exposed in all of the layers on the cutting plane C1 of the green chip.

In addition, the method for forming the internal electrode pattern layer 12a is not particularly limited, and it may be formed by a thin film forming method such as vapor deposition or sputtering other than a printing method and a transcription method.

In addition, a step absorbing layer 20 may be formed at the gap 32 of the internal electrode pattern layer 12a. The step on the surface of the green sheet 10a due to the internal electrode pattern layer 12a is eliminated by forming the step absorbing layer 20, and the step absorbing layer 20 finally contributes to the prevention of deformation of the ceramic sintered body 4 to be obtained.

The step absorbing layer 20 is formed by a printing method or the like in the same manner as the internal electrode pattern layer 12a, for example. The step absorbing layer 20 contains a ceramic powder and an organic vehicle which are the same as those in the green sheet 10a, but it is formed by a printing method unlike the green sheet 10a, and thus the ceramic powder and the organic vehicle are adjusted so as to be easily printed. Examples of the printing method may include screen printing and gravure printing.

The green chip is solidified by removing the plasticizer through solidification and drying. The green chip after the solidification and drying is introduced into the barrel container together with the media and the polishing liquid and subjected to barrel polishing by a horizontal centrifugal barrel machine or the like. The green chip after the barrel polishing is washed with water and dried. The green chip after drying is subjected to a binder removal step, a calcination step, and an annealing step to be conducted if necessary, whereby the element body 3 is obtained.

Known conditions may be set for the binder removal step, and for example, the retention temperature may be set to from 200° C. to 900° C.

In the present embodiment, the calcination step and the annealing step may be conducted under known conditions, and for example, the retention temperature for calcination is from 1100° C. to 1300° C., and the retention temperature for annealing is from 500° C. to 1100° C.

The binder removal step, the calcination step, and the annealing step may be conducted continuously or independently.

After the calcination step and the annealing step, an insulation treatment for the end portions of the internal electrode layers is performed. In the present embodiment, calcination in the air atmosphere is performed to conduct the insulation treatment for the end portions of the internal electrode layers. This insulation treatment is preferably conducted under the following conditions: temperature rising rate is 100° C. to 5000° C./hour; retention temperature is 500° C. to 1000° C.; and the atmosphere is the air.

The both end surfaces in the Y-axis direction and/or the both end surfaces in the Z-axis direction of the element body 3 obtained as described above may be polished, for example, by barrel polishing or sandblasting if necessary.

Next, paste for insulating layer is applied and baked on the both end surfaces in the X-axis direction of the element body 3 so as to form the insulating layer 16 and obtain the ceramic sintered body 4 illustrated in FIG. 1 and FIG. 2. With this insulating layer 16, not only the insulating properties are enhanced but also the moisture resistance is favorable. In the case of coating the paste for insulating layer, the paste is configured to be coated not only on the both end portions in the X-axis direction of the element body 3 but also on the both end portions in the X-axis direction of the both end surfaces in the Z-axis direction of the element body 3.

In the case of constituting the insulating layer by glass, this paste for insulating layer may be obtained, for example, by kneading the raw material for glass described above, a binder containing ethyl cellulose as the main component, and terpineol and acetone of the dispersion medium by a mixer.

The element body 3 is coated with the paste for insulating layer by any coating method, such as dipping, printing, coating, vapor deposition, and sputtering, but is preferably coated by dipping in view of adjusting W1/W0 or Mf/Mt.

The ceramic sintered body 4 is obtained by coating the paste for insulating layer on the element body 3, drying, subjecting to the binder removal treatment, and baking the paste.

The glass component that is liquefied at the time of baking easily penetrates into the gap from the end portion of the inner dielectric layer 10 to the end portion of the internal electrode layer 12 by the capillary action. Accordingly, the gap is reliably filled with the insulating layer 16, and thus not only the insulating properties are enhanced but also the moisture resistance is favorable.

The both end surfaces in the Y-axis direction and/or the both end surfaces in the Z-axis direction of the ceramic sintered body 4 obtained as described above may be polished, for example, by barrel polishing, sandblasting, or the like if necessary.

Next, the paste for external electrode is coated and baked on the both end surfaces in the Y-axis direction of the ceramic sintered body on which the insulating layer 16 is baked to form the external electrodes 6 and 8. The formation of the external electrodes 6 and 8 may be conducted before the formation of the insulating layer 16 or after the formation of the insulating layer 16 or may be simultaneously conducted with the formation of the insulating layer 16, and preferably it is conducted after the formation of the insulating layer 16.

The method for forming the external electrodes 6 and 8 is not particularly limited, and it is possible to use an appropriate method such as coating and baking of the paste for external electrode, plating, vapor deposition, or sputtering.

If necessary, a covering layer is formed on the four surfaces of the external electrodes by plating or so.

The multilayer ceramic capacitor 2 of the present embodiment thus manufactured is mounted on a printed circuit board by soldering or the like and used in various kinds of electronic devices.

In the prior art, a portion of the dielectric layer is adopted as a gap portion, and thus a blank pattern in which the internal electrode pattern layer is not formed is formed at the portion to be the gap portion after calcination of the surface of the green sheet at a predetermined interval along the X-axis direction.

In contrast, in the present embodiment, the internal electrode pattern layer is continuously formed along the X-axis direction, and the gap portion is obtained by forming an insulating layer on the element body. Hence, a blank pattern for forming the gap portion is not formed. Accordingly, a flat film of the internal electrode pattern layer is formed on the green sheet unlike the method of the prior art. Hence, the number of acquisition of the green chip per area of the green sheet can be increased as compared to the prior art.

In addition, in the present embodiment, the green laminate is cut without having to worry about the blank pattern unlike the prior art, and thus the yield of cutting is improved as compared to that in the prior art.

Furthermore, there is a problem in the prior art that the thickness of the blank pattern portion is thinner as compared to the portion at which the internal electrode pattern layer is formed when the green sheet is laminated and thus the green chip is curved in the vicinity of the cutting plane thereof when the green laminate is cut. In addition, in the prior art, a bump is formed near the blank pattern portion of the internal electrode pattern layer, and thus irregularities is caused on the internal electrode layer and it is concerned that the internal electrode or green sheet is deformed as these are laminated. In contrast, in the present embodiment, the blank pattern is not formed and the bump of the internal electrode pattern layer is also not formed.

Furthermore, in the present embodiment, the internal electrode pattern layer is a flat film, a bump of the internal electrode pattern layer is not formed, and bleeding or blurring of the internal electrode pattern layer is not caused in the vicinity of the gap portion, and thus it is possible to improve the acquisition capacity. This effect is more remarkable as the element body is smaller.

The embodiments of the present invention have been described, but the present invention is not limited to the embodiments described above in any way and may be variously modified within the scope of the present invention.

Figure 5B:
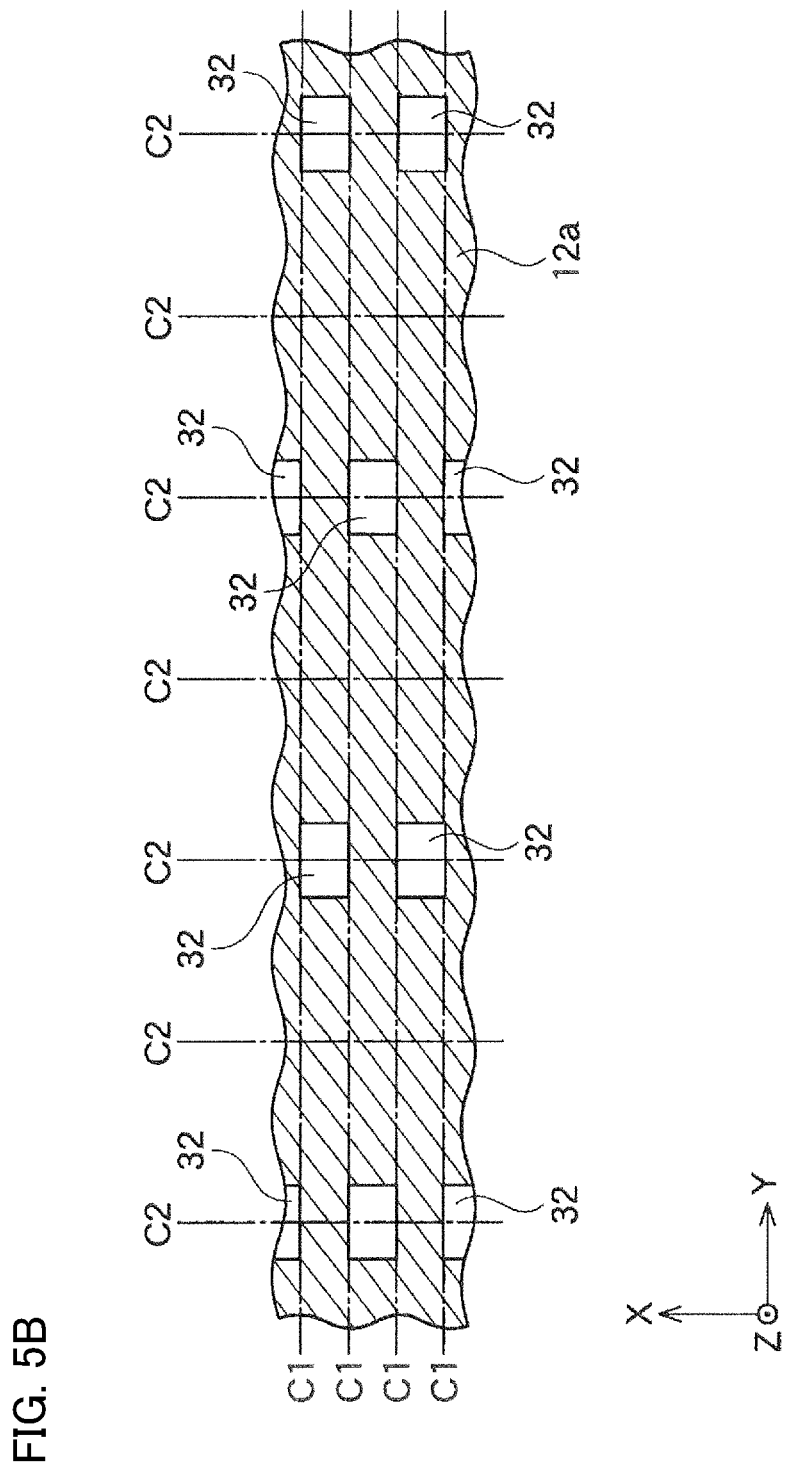
FIG. 5B is a plan view illustrating a portion of the internal electrode pattern layer taken along the line V-V illustrated in FIG. 4.

In addition to the patterns illustrated in FIG. 5Aa and FIG. 5Ab, the internal electrode pattern layer 12a may be a pattern having the gap 32 of the grid-like internal electrode pattern layer 12a as illustrated in FIG. 5B, for example.

In addition, the multilayer electronic component of the present invention is not limited to a multilayer ceramic capacitor, but it can be applied to other multilayer electronic components. Other multilayer electronic components are all of the electronic parts in which the dielectric layer is laminated via an internal electrode, and examples thereof may include a bandpass filter, a chip inductor, a laminated three-terminal filter, a piezoelectric element, a chip thermistor, a chip varistor, a chip resistor, and other surface mounted (SMD) chip type electronic parts.

EXAMPLES

Hereinafter, the present invention will be described based on further detailed Examples, but the present invention is not limited to these Examples.

Example 1

The capacitor samples of sample No. 1 to sample No. 8 were fabricated as follows to measure elastic modulus and evaluate thermal shock resistance and sound pressure.

First, a $BaTiO_3$-based ceramic powder: 100 parts by weight, a polyvinyl butyral resin: 10 parts by weight, dioctyl phthalate (DOP) as a plasticizer: 5 parts by weight, an alcohol as a solvent: 100 parts by weight were mixed and pasted by a ball mill, thereby obtaining a paste for inner green sheet.

In addition, apart from to the above, Ni particles: 44.6 parts by weight, terpineol: 52 parts by weight, ethyl cellulose: 3 parts by weight, and benzotriazole: 0.4 parts by weight were kneaded and formed into to a slurry by a triple roll, thereby preparing a paste for internal electrode layer.

The inner green sheet 10a was formed on a PET film by using the paste for inner green sheet prepared in the above so as to have a thickness after drying of 7 Subsequently, the internal electrode pattern layer 12a was printed thereon in a predetermined pattern by using the paste for internal electrode layer, and the sheet was peeled off from the PET film. Then, the inner green sheet 10a having the internal electrode pattern layer 12a was obtained.

As illustrated in FIG. 4, the internal laminate 13a was manufactured by laminating the inner green sheet 10a having the internal electrode pattern layer 12a, an appropriate number of the outer green sheets 11a was then formed above and below the internal laminate 13a by using the paste for outer green sheet, and the resultant was pressurized and bonded in the laminating direction, thereby obtaining a green laminate. The paste for outer green sheet was obtained by the same method as the paste for inner green sheet.

Next, the green laminate was cut along the cutting plane C1 and the cutting plane C2 to obtain a green chip as illustrated in FIG. 5Aa, FIG. 5Ab, FIG. 6A, and FIG. 6B.

Next, the green chip thus obtained was subjected to the binder removal treatment, the calcination, and the annealing under the following conditions, thereby obtaining the element body 3.

The condition for binder removal treatment was set so as to have a rate of temperature rise: 60° C./hour, a retention temperature: 260° C., a temperature retention time: 8 hours, and an atmosphere: in the air.

The condition for calcination was set so as to have a rate of temperature rise: 200° C./hour, a retention temperature: from 1000° C. to 1200° C., a temperature retention time: 2 hours, and a cooling speed: 200° C./hour. Incidentally, the atmosphere gas was a humidified $N_2+H_2$ mixed gas.

The condition for annealing was set so as to have a rate of temperature rise: 200° C./hour, a retention temperature: from 500° C. to 1000° C., a temperature retention time: 2 hours, a cooling speed: 200° C./hour, and an atmosphere gas: humidified $N_2$ gas.

Incidentally, a wetter was used for the humidification of the atmosphere gas at the time of calcination and annealing.

Next, an insulation treatment for the end portion of the internal electrode layer was performed.

Next, a paste for insulating layer was prepared by kneading glass powder having composition and softening point illustrated in Table 1, a binder containing ethyl cellulose as the main component, and terpineol and acetone of the dispersion medium by a mixer.

The chip obtained by coating the paste for insulating layer on the entire surface of the end surface in the X-axis direction, the end portion in the X-axis direction on the end surface in the Y-axis direction, and the end portion in the X-axis direction on the end surface in the Z-axis direction of the element body 3 through dipping and drying the paste was subjected to the binder removal treatment and baking using a belt conveyor furnace to form the insulating layer 16 on the element body 3, thereby obtaining the ceramic sintered body 4. The conditions for drying of the paste for insulating layer, binder removal treatment, and baking were as follows.

Drying
Temperature: 180° C.
Binder removal treatment
Rate of temperature rise: 1000° C./hour
Retention temperature: 500° C.
Temperature retention time: 0.25 hour
Atmosphere: in the air
Baking
Rate of temperature rise: 700° C./hour
Retention temperature: from 700° C. to 1000° C.
Temperature retention time: 0.5 hour
Atmosphere: humidified $N_2$ gas The end surface in the Y-axis direction of the ceramic sintered body 4 thus obtained was polished by barrel treatment.

Next, 100 parts by weight of a mixture of spherical Cu particles having an average particle size of 0.4 µm and a flaky Cu powder, 30 parts by weight of an organic vehicle (one prepared by dissolving 5 parts by weight of an ethyl cellulose resin in 95 parts by weight of butyl carbitol), and 6 parts by weight of butyl carbitol were kneaded to obtain a pasted paste for external electrode.

The obtained paste for external electrode was transcripted on the end surface in the Y-axis direction of the ceramic sintered body 4 and calcinated for 10 minutes at 850° C. in $N_2$ atmosphere to form the external electrodes 6 and 8. Then, the multilayer ceramic capacitor 2 was obtained.

The capacitor sample (multilayer ceramic capacitor 2) manufactured in this way had a size of 3.2×2.5×1.5 mm, and the inner dielectric layer 10 was 10-layered. Incidentally, the inner dielectric layer 10 had a thickness of 5.0 µm, the internal electrode layer 12 had a thickness of about 1.2 µm, and a width Wgap in the X-axis direction of the gap portion constituted by the insulating layer 16 was about 20.0 µm.

The capacitor sample and the like thus obtained was measured or evaluated by the following methods.

<Elastic Modulus>

Elastic modulus was measured by performing indentation depth test due to nano-indentation to the end surface in the X-axis direction where the insulating layer of the capacitor sample was formed. The result is shown in Table 2.

The specific method is as below. Incidentally, ENT-2100 (by ELIONIX INC.) was used for the indentation test device.

(1) First, the end surface in the X-axis direction of the capacitor sample was placed on a sample stage with the end surface faced upward and fixed by hot wax.

(2) Thereafter, the indentation test was performed under a measuring condition of the indentation maximum load of 500 mN so that a diamond indentor was positioned at the center on the end surface in the X-axis direction of the capacitor sample.

<Thermal Shock Resistance>

100 capacitor samples were immersed into molten solder of 250° C. at a rate of 10 cm/sec and pulled up at 10 cm/sec in 10 seconds. After this operation was repeated 10 times, insulation resistance was measured to inspect short circuit defective rate. The result is shown in Table 2. A short circuit defective rate of 0% at 250° C. was determined as being favorable.

<Sound Pressure>

With a FAV-3 anechoic box (by KOYO ELECTRONICS INDUSTRIES CO., LTD), a signal generator, an oscilloscope for confirmation, and an analysis software DS-0221 (by Ono Sokki), a circuit board where a microphone and the capacitor samples are mounted was put into the anechoic box. Then, an AC voltage was applied under transmission conditions of frequencies of 1 kHz and 0.5 kHz steps and DC bias of 20 V by the signal generator while the samples were separated from the microphone by 5 cm, and a sound pressure generated in the circuit board was measured in the range of 2 to 4 kHz. The result is shown in Table 2. Incidentally, as the evaluation standard, it was considered that a sound pressure of less than 40 dB was more favorable, and that a sound pressure of 40 dB to less than 50 dB was favorable. It can be considered that the lower a sound pressure is, the further an acoustic noise is reduced.

TABLE 1

| Example 1 Sample number | BaO | SiO$_2$ | Na$_2$O | Bi$_2$O$_3$ | ZrO$_2$ | Al$_2$O$_3$ | CaO | Softening point (° C.) |
|---|---|---|---|---|---|---|---|---|
| 1 | ○ | — | ○ | ○ | — | — | — | 545 |
| 2 | ○ | ○ | ○ | ○ | — | — | — | 531 |
| 3 | ○ | ○ | — | ○ | — | — | ○ | 592 |
| 4 | ○ | ○ | — | — | — | — | ○ | 637 |
| 5 | ○ | ○ | — | — | — | ○ | — | 732 |
| 6 | ○ | ○ | — | — | ○ | ○ | ○ | 779 |
| 7 | ○ | ○ | — | — | ○ | — | — | 820 |
| 8 | ○ | ○ | — | — | ○ | ○ | — | 850 |

TABLE 2

| Example 1 Sample number | Elastic modulus (GPa) | Thermal shock resistance | Sound pressure evaluation (2~4 kHz) |
|---|---|---|---|
| 1 | 10 | X: 9% | ○: 41 dB |
| 2 | 12 | ○: 0% | ○: 42 dB |
| 3 | 35 | ○: 0% | ○: 45 dB |
| 4 | 68 | ○: 0% | ○: 46 dB |
| 5 | 90 | ○: 0% | ○: 47 dB |
| 6 | 140 | ○: 0% | ○: 49 dB |
| 7 | 180 | ○: 0% | X: 52 dB |
| 8 | 200 | ○: 0% | X: 54 dB |

It was confirmed that the thermal shock resistance was favorable when the elastic modulus was more than 10 GPa to less than 180 GPa (sample No. 2 to sample No. 6), compared with when the elastic modulus was 10 GPa (sample No. 1). It was confirmed that when the elastic modulus was 10 GPa, the sample was unable to resist on thermal impact due to too strong influence of elasticity, and crack and short circuit were generated.

It was confirmed that the sound pressure was favorable and the acoustic noise was able to be reduced when the elastic modulus was more than 10 GPa to less than 180 GPa (sample No. 2 to sample No. 6), compared with when the elastic modulus was 180 GPa or more (sample No. 7 and sample No. 8).

Example 2

The capacitor samples of sample No. 9 to sample No. 16 were fabricated in the same manner as Example 1, except that the method for applying the paste for insulating layer was as below. Then, the elastic modulus and the ratio (W1/W0) of the width W1 along the X-axis of the insulating layer extension portions 16a to the width W0 along the X-axis of the element body 3 were measured, and the thermal shock resistance and the sound pressure were evaluated. The result is shown in Table 3. Incidentally, the measurement of the elastic modulus of sample No. 9 to sample No. 16 and the evaluation of the thermal shock resistance and the sound pressure were performed in the same manner as Example 1. The method for measuring W1/W0 was as follows.

A paste for masking was applied by dipping to the middle portion in the X-axis direction of the end surface in the Y-axis direction and the middle portion in the X-axis direction of the end surface in the Z-axis direction of the element body 3. Thereafter, a paste for insulating layer was applied by dipping to the entire end surface in the X-axis direction, the end portion in the X-axis direction of the end surface in the Y-axis direction, and the end portion in the X-axis direction of the end surface in the Z-axis direction of the element body 3. In this time, W1 was adjusted by adjusting the thickness in the X-axis direction of the paste for insulating layer under a constant lowering time of the element body 3 (30 seconds).

<W1/W0>

The resin embedding was conducted so that the capacitor sample stood facing down the end surface in the Y-axis direction, and the other end surface was polished along the Y-axis direction of the multilayer ceramic capacitor 2, thereby obtaining a polished cross section having the length of the Y-axis direction of the element body 3 of 1/2L0. Next, this polished cross section was subjected to ion milling to remove the undercut caused by polishing. A cross section for observation was obtained in this manner.

Next, the width W0 along the X-axis of the element body and the width W1 along the X-axis of the insulating layer extension portion illustrated in FIG. 2 were measured on the cross section. For measuring the widths, a digital microscope (VHX microscope by KEYENCE CORPORATION) was used, and observation and measurement were performed by a 5000 magnification lens.

W0 of the two insulating layers 16 was measured per one sample, and W1 was measured at four places of corners of the insulating layers 16 per one sample. This operation was performed for 30 capacitor samples to calculate an average of W1/W0. This result is shown in Table 3. Incidentally, portions where the insulating layer was defected were not counted.

TABLE 3

| Example 2 Sample number | Elastic modulus (GPa) | Paste thickness (μm) | W1/W0 | Thermal shock resistance | Sound pressure evaluation (2~4 kHz) |
|---|---|---|---|---|---|
| 9 | 68 | 50 | No insulating layer extension portion | ○: 0% | ○: 44 dB |
| 10 | 68 | 55 | 1/50 | ○: 0% | ○: 41 dB |
| 11 | 68 | 70 | 1/30 | ○: 0% | ◉: 39 dB |

TABLE 3-continued

| Example 2 Sample number | Elastic modulus (GPa) | Paste thickness (μm) | W1/W0 | Thermal shock resistance | Sound pressure evaluation (2~4 kHz) |
|---|---|---|---|---|---|
| 12 | 68 | 75 | 1/20 | ○: 0% | ⊚: 38 dB |
| 13 | 68 | 80 | 1/15 | ○: 0% | ⊚: 37 dB |
| 14 | 68 | 85 | 1/10 | ○: 0% | ⊚: 36 dB |
| 15 | 68 | 90 | 1/5 | ○: 0% | ⊚: 35 dB |
| 16 | 68 | 100 | 1/2 | ○: 0% | ○: 42 dB |

It was confirmed that the sound pressure was favorable when having the insulating layer extension portion (sample No. 10 to sample No. 16), compared with when having no insulating layer extension portion (sample No. 9). It is considered that this is because structural defect due to electrostriction was able to be further reduced by having the insulating layer extension portion.

It was confirmed that the sound pressure was particularly favorable when having the insulating layer extension portion and 1/30≤W1/W0<1/2 is satisfied (sample No. 11 to sample No. 15), compared with when having no insulating layer extension portion (sample No. 9), when the insulating layer extension portion was 1/30 (sample No. 10), or when W1/W0 was 1/2 (sample No. 16). It is considered that this is because when W1/W0 is 1/2, one of the insulating layer extension portions and the other insulating layer extension portion are connected, and the effect of reduction of electrostriction is decreased due to thinning of the insulating layer covering the end surface in the X-axis direction.

Example 3

The capacitor samples of sample No. 17 to sample No. 22 were fabricated in the same manner as Example 1, except that the method for applying the paste for insulating layer was as below. Then, the elastic modulus, W1/W0, and the ratio (Mf/Mt) of a maximum thickness Mf in the Z-axis direction of the insulating layer 16 from the end surface in the Z-axis direction of the element body 3 to a maximum thickness Mt in the X-axis direction of the insulating layer 16 from the end surface in the X-axis direction of the element body 3 were measured, and the thermal shock resistance, the sound pressure, and the fixing strength were evaluated. The result is shown in Table 4. Incidentally, the measurement of the elastic modulus of sample No. 17 to sample No. 22 and the evaluation of the thermal shock resistance and the sound pressure were performed in the same manner as Example 1. The method for measuring Mf/Mt and the method for evaluating the fixing strength were as follows.

A paste for masking was applied by dipping to the middle portion in the X-axis direction of the end surface in the Y-axis direction and the middle portion in the X-axis direction of the end surface in the Z-axis direction of the element body 3. Thereafter, a paste for insulating layer was applied by dipping to the entire end surface in the X-axis direction, the end portion in the X-axis direction of the end surface in the Y-axis direction, and the end portion in the X-axis direction of the end surface in the Z-axis direction of the element body 3. In this time, Mt was adjusted by adjusting the thickness in the X-axis direction of the paste for insulating layer of the element body 3, the dipping time of the element body 3 (lowering time), and the number of times of the dipping.

The resin embedding was conducted so that the capacitor sample stood facing down the end surface in the Y-axis direction, and the other end surface was polished along the Y-axis direction of the multilayer ceramic capacitor, thereby obtaining a polished cross section having the length of the Y-axis direction of the element body of 1/2L0. Next, this polished cross section was subjected to ion milling to remove the undercut caused by polishing. A cross section for observation was obtained in this manner.

Next, the maximum thickness Mf in the Z-axis direction of the insulating layer from the end surface in the Z-axis direction of the element body and the maximum thickness Mt in the X-axis direction of the insulating layer from the end surface in the X-axis direction of the element body shown in FIG. 3 were measured on the cross section. For measuring the widths, a digital microscope (VHX microscope by KEYENCE CORPORATION) was used, and observation and measurement were performed by a 5000 magnification lens.

With respect to one sample, Mf was measured at four points of corners of the insulating layer 16. When one convex part appears on the cross section of one of the insulating layers 16 as shown in FIG. 3A, Mt was measured at the one part, and Mf/Mt was obtained by respectively considering Mt at two parts of the same insulating layer as denominator. When two convex portions appear on the cross section of one of the insulating layers 16 as shown in FIG. 3B, Mt was measured at the two points, and the thicker one was employed. Then, Mf/Mt was obtained by considering Mf at the convex portion employed as denominator.

Mf/Mt was respectively obtained with respect to two insulating layers formed on one capacitor sample. This operation was performed to 30 capacitor samples so as to obtain an average. The result is shown in Table 4. Incidentally, portions where the insulating layer was defected were not counted.

<Fixing Strength Measurement>

Figure 7:
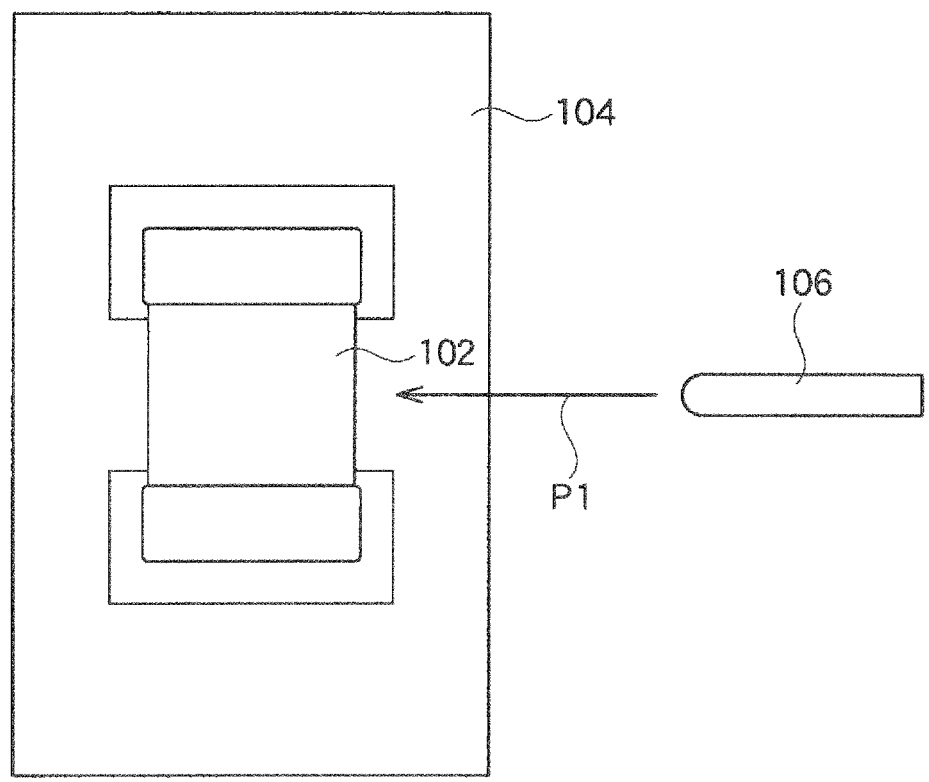
FIG. 7 is a schematic view for explaining a method for measuring fixing strength of the present Example.

With regard to fixing strength test, as illustrated in FIG. 7, a cemented carbide pressurizing jig 106 was directed toward the end surface in the X-axis direction of the capacitor sample 102 at a rate of 30 mm/min in a state in which the capacitor sample 102 was mounted on the circuit board 104, and the capacitor sample 102 was pressurized by the pressurizing jig 106 4 N from the direction of an arrow P1. In this time, fixing strength was evaluated by whether the capacitor sample 102 was broken due to a load of 10N. The test was performed for 100 capacitor samples. The result is shown in Table 4. As the evaluation standard, the fact that a defect ratio of fixing strength was less than 10% was considered to be more favorable, and the fact that a defect ratio of fixing strength was 10% to less than 15% was considered to be favorable. Incidentally, the inner structure of the capacitor sample 102 according to the present embodiment was the same as that of the multilayer ceramic capacitor 2 shown in FIG. 1 and FIG. 2.

TABLE 4

| Example 3 Sample number | Elastic modulus (GPa) | Dipping time (sec) | Number of times of dipping (times) | W1/W0 | Mf/Mt | Thermal shock resistance | Sound pressure evaluation (2~4 kHz) | Fixing strength |
|---|---|---|---|---|---|---|---|---|
| 17 | 68 | 10 | 1 | 1/30 | 0.1 | ○: 0% | ○: 44 dB | ◎: 5% |
| 18 | 68 | 20 | 1 | 1/30 | 0.5 | ○: 0% | ◎: 39 dB | ◎: 3% |
| 19 | 68 | 30 | 2 | 1/30 | 1.0 | ○: 0% | ◎: 39 dB | ◎: 7% |
| 20 | 68 | 45 | 2 | 1/30 | 1.5 | ○: 0% | ◎: 38 dB | ◎: 7% |
| 21 | 68 | 60 | 3 | 1/30 | 2.0 | ○: 0% | ◎: 37 dB | ◎: 9% |
| 22 | 68 | 90 | 3 | 1/30 | 2.5 | ○: 0% | ◎: 35 dB | X: 17% |

It was confirmed that the sound pressure was favorable when Mf/Mt was more than 0.1 (sample No. 18 to sample No. 22), compared with when Mf/Mt was 0.1 (sample No. 17). It is considered that this was because structural defect was able to be prevented due to sufficient coating of the insulating layer extension portion to the end surface in the Z-axis direction of the element body Thus, it is considered that the acoustic noise can be reduced when Mf/Mt is more than 0.1 compared with when Mf/Mt was 0.1.

It was confirmed that the fixing strength was favorable when Mf/Mt was less than 2.5 (sample No. 17 to sample No. 21), compared with when Mf/Mt was 2.5 (sample No. 22). Thus, it is considered that soldering at the time of mounting is favorably performed when Mf/Mt is less than 2.5 (sample No. 17 to sample No. 21), compared with when Mf/Mt is 2.5 (sample No. 22).

Example 4

The components constituting the insulating layer were ones shown in Table 5. When the insulating layer was resin (sample No. 24), bisphenol type epoxy resin, not paste for insulating layer, was applied to the entire end surface in the X-axis direction, the end portion in the X-axis direction of the end surface in the Y-axis direction, and the end portion in the X-axis direction of the end surface in the Z-axis direction, and dried at 180° C. In this time, neither binder removal treatment nor baking was performed. When the insulating layer was ceramic (sample No. 25), a paste for insulating layer containing ceramic, not glass, was used. When the insulating layer was glass (sample No. 23), the retention temperature at baking was 700° C. When the insulating layer was ceramic (sample No. 25), the retention time at baking was 1000° C. Except for the above, the capacitor samples of sample No. 23 to sample No. 25 were fabricated in the same manner as Example 1. Then, elastic modulus, W1/W0, and Mf/Mt were measured, and thermal shock resistance, sound pressure, and fixing strength were evaluated. The result is shown in Table 5. Incidentally, the measurement of elastic modulus, W1/W2, and Mf/Mt and the evaluation of thermal shock resistance, sound pressure, and fixing strength with respect to sample No. 23 to sample No. 25 were performed in the same manner as Example 1 to Example 3.

TABLE 5

| Example 4 Sample number | Elastic modulus (GPa) | W1/W0 | Mf/Mt | Insulating layer | Thermal shock resistance | Sound pressure evaluation (2~4 kHz) | Fixing strength |
|---|---|---|---|---|---|---|---|
| 23 | 68 | 1/30 | 0.5 | glass | ○: 0% | ◎: 39 dB | ◎: 3% |
| 24 | 20 | 1/30 | 0.3 | resin | ○: 0% | ◎: 33 dB | ○: 12% |
| 25 | 120 | 1/30 | 0.7 | ceramic | ○: 0% | ○: 46 dB | ○: 14% |

It was confirmed that all of the thermal shock resistance, sound pressure, and fixing strength were favorable when the insulating layer was glass (sample No. 23). The fixing strength was favorable when the insulating layer was glass (sample No. 23), compared with when the insulating layer was resin (sample No. 24). Further, the sound pressure and the fixing strength were favorable when the insulating layer was glass (sample No. 23), compared with when the insulating layer was ceramic (sample No. 25). It is considered that this was because adhesion between the glass and the element body were more favorable than adhesion between the resin or ceramic and the element body.

Example 5

The capacitor samples of sample No. 26 to sample No. 30 were fabricated in the same manner as Example 1, except that the composition of glass powder and the softening point were as shown in Table 6, and that the retention temperature at baking was 700° C. Then, elastic modulus, W1/W0, and Mf/Mt were measured, and thermal shock resistance, sound pressure, fixing strength, and plating resistance. The result is shown in Table 7. Incidentally, the measurement of elastic modulus, W1/W0, and Mf/Mt and the evaluation of thermal shock resistance, sound pressure, and fixing strength with respect to sample No. 26 to sample No. 30 were performed in the same manner as Example 1 to Example 3. The method for evaluating plating resistance was as below. The total of the composition of $BaO$, $SiO_2$, $Na_2O$, and $Bi_2O_3$ in the glass powder of sample No. 26 to sample No. 39 in Table 6 is not 100 mass %. This is because the glass powder contained minute components other than $BaO$, $SiO_2$, $Na_2O$, and $Bi_2O_3$.

<Plating Resistance>

Ni plating was performed to the capacitor samples in Ni plating solution with immersion temperature of 50° C. and immersion time of 120 min. Thereafter, Sn plating was performed thereto in Sn plating solution with immersion temperature of 25° C. and immersion time of 80 min. Then, insulation resistance was measured, and short circuit defective rate was inspected. The result is shown in Table 7. A short defective rate of 0% was considered to be favorable.

TABLE 6

| Example 5 Sample number | BaO | SiO$_2$ | Na$_2$O | Bi$_2$O$_3$ | Softening point (° C.) |
|---|---|---|---|---|---|
| 26 | 50 mass % | 10 mass % | 10 mass % | 10 mass % | 511 |
| 27 | 50 mass % | 20 mass % | 5 mass % | — | 531 |
| 28 | 20 mass % | 50 mass % | — | 5 mass % | 592 |
| 29 | 40 mass % | 40 mass % | 3 mass % | 2 mass % | 637 |
| 30 | 40 mass % | 50 mass % | — | — | 732 |

TABLE 7

| Example 5 Sample number | Elastic modulus (GPa) | W1/W0 | Mf/Mt | Thermal shock resistance | Sound pressure evaluation (2~4 kHz) | Fixing strength | Plating resistance |
|---|---|---|---|---|---|---|---|
| 26 | 15 | 1/30 | 0.5 | ○: 0% | ⊚: 39 dB | ⊚: 5% | X: 100% |
| 27 | 29 | 1/30 | 0.8 | ○: 0% | ⊚: 39 dB | ⊚: 7% | X: 20% |
| 28 | 102 | 1/30 | 0.6 | ○: 0% | ⊚: 37 dB | ⊚: 7% | X: 10% |
| 29 | 94 | 1/30 | 1.0 | ○: 0% | ⊚: 37 dB | ⊚: 7% | ○: 0% |
| 30 | 108 | 1/30 | 0.7 | ○: 0% | ⊚: 36 dB | ⊚: 7% | ○: 0% |

It was confirmed that plating resistance was favorable when Na$_2$O and Bi$_2$O$_3$ were contained respectively at less than 5 mass % (sample No. 29 and sample No. 30), compared with when Na$_2$O or Bi$_2$O$_3$ was contained at 5 mass % or more (sample No. 26 to sample No. 28).

INDUSTRIAL APPLICABILITY

As described above, the multilayer ceramic electronic component according to the present invention is useful as an electronic part to be used in laptop computers or smart phones which are often used to have a great capacity while being compact.

EXPLANATIONS OF LETTERS OR NUMERALS 2, 102 . . . multilayer ceramic capacitor
3 . . . element body
4 . . . ceramic sintered body
6 . . . first external electrode
8 . . . second external electrode
10 . . . inner dielectric layer
10a . . . inner green sheet
11 . . . exterior region
11a . . . outer green sheet
12 . . . internal electrode layer
12A, 12B . . . lead portion
12a . . . internal electrode pattern layer
13 . . . interior region
13a . . . internal laminate
14 . . . capacity region
15A, 15B . . . lead region
16 . . . insulating layer
16a . . . insulating layer extension portion
20 . . . step absorbing layer
32 . . . gap between internal electrode pattern layers
104 . . . circuit board
106 . . . pressurizing jig

The invention claimed is:

1. A multilayer electronic component comprising an element body having an internal electrode layer and a dielectric layer, both of which are substantially parallel to a plane including a first axis along a first axis direction and a second axis along a second axis direction and are alternately laminated along a third axis direction, wherein a pair of side surfaces facing each other in the first axis direction of the element body is respectively equipped with an insulating layer, a pair of end surfaces facing each other in the second axis direction of the element body is respectively equipped with an external electrode electrically connected to the internal electrode layer, an elastic modulus of the insulating layer is 12 GPa to 140 GPa, the insulating layer integrally has an insulating layer extension portion covering part of main surfaces facing each other in the third axis direction of the element body, the external electrode covers at least part of the insulating layer extension portion, and a formula (1) of $1/30 \leq W1/W0 < 1/2$ is satisfied, where W0 denotes a width of the element body along the first axis, and W1 denotes a width of the insulating layer extension portion along the first axis.

2. The multilayer electronic component according to claim 1, wherein a formula (2) of $0.5 \leq Mf/Mt \leq 2.0$ is satisfied, where Mf denotes a maximum thickness in the third axis direction of the insulating layer from the main surface of the element body, and Mt denotes a maximum thickness in the first axis direction of the insulating layer from the side surface of the element body.

3. The multilayer electronic component according to claim 1, wherein the insulating layer comprises a glass component.

4. The multilayer electronic component according to claim 1, wherein the insulating layer respectively contains Bi$_2$O$_3$ and Na$_2$O of less than 5 mass %.

* * * * *